(12) United States Patent
Schuller et al.

(10) Patent No.: US 6,341,950 B1
(45) Date of Patent: Jan. 29, 2002

(54) PISTON PUMP

(75) Inventors: Wolfgang Schuller, Sachsenheim; Erwin Sinnl, Meimsheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/045,537

(22) Filed: Mar. 23, 1998

(30) Foreign Application Priority Data

Mar. 21, 1997 (DE) .......................................... 197 11 786

(51) Int. Cl.⁷ ................................................ F04B 19/22
(52) U.S. Cl. .......................... 417/554; 417/541; 92/172
(58) Field of Search .............................. 417/554, 470, 417/540, 541; 92/117 A, 117 R, 172

(56) References Cited

U.S. PATENT DOCUMENTS

| 4,321,987 A | * | 3/1982 | Dressell, Jr. et al. ......... 92/172 |
| 5,037,276 A | * | 8/1991 | Tremoulet, Jr. ............. 417/470 |
| 5,072,655 A | | 12/1991 | Adler |
| 5,213,482 A | | 5/1993 | Reinartz et al. |
| 5,404,913 A | | 4/1995 | Gilligan |
| 5,642,654 A | * | 7/1997 | Parekh et al. .................. 92/172 |
| 5,787,792 A | * | 8/1998 | Illgner ...................... 92/117 A |
| 5,996,468 A | * | 12/1999 | Grosspietsch ................ 92/172 |

FOREIGN PATENT DOCUMENTS

| DE | 2548702 A1 | 10/1975 | |
| DE | 28 44 047 | * 4/1980 | ................. 417/470 |
| DE | 3406782 A1 | 2/1984 | |
| DE | 40 27 794 A1 | 3/1992 | |
| DE | 44 07 978 A1 | 9/1995 | |
| WO | WO 96/28659 | 3/1996 | |

* cited by examiner

Primary Examiner—Erick R. Solis
(74) Attorney, Agent, or Firm—Ronald E. Greigg

(57) ABSTRACT

The invention relates to a piston pump, which is intended for use as a return pump for a slip-controlled hydraulic vehicle brake system. To simplify the manufacture of a piston of the piston pump, the piston includes a thin sleeve.

20 Claims, 2 Drawing Sheets

PISTON PUMP

BACKGROUND OF THE INVENTION

The invention relates to a piston pump which is intended for use as a return pump for a slip-controlled vehicle brake system.

Many such piston pumps are known. As an example, German Patent Disclosure DE 40 27 794 A1 can be named. The known piston pump has a pump housing, into which a bush is inserted, in which bush a piston that can be driven to reciprocate is axially received. The piston is a part made by metal-cutting drilling and turning. The production of the piston is therefore complicated and expensive.

OBJECT AND SUMMARY OF THE INVENTION

The piston of the piston pump according to the invention has a sleeve or a plurality of sleeves that form a circumferential piston wall. This sleeve may be produced by reshaping a piece of pipe, for instance. The piston of the piston pump according to the invention can as a result be manufactured quickly and economically.

Another advantage of the piston pump of the invention is the thin-walled embodiment of its piston because of the use of a sleeve that forms the circumferential piston wall. This has the advantage that the piston has a large-volume interior, which if it communicates with a brake fluid that can be fed by the piston pump forms a damper chamber. This interior damps pressure pulsations and pressure surges in the brake fluid, which in operation are brought about by the piston pump because of its discontinuous pumping mode. This provision improves pumping performance and efficiency of the piston pump, provides noise abatement, and leads to a reduced mechanical strain on the piston pump as well as components hydraulically connected to it. In most cases, a separate vibration damper can be dispensed with.

The invention will be better understood and further objects and advantages thereof will become more apparent from the ensuing detailed description of preferred embodiments taken in conjunction with the drawings.

BRIEF DESCRIPTION OF THE DRAWINGS

The two drawing figures show two embodiments of piston pumps according to the invention in axial section.

DESCRIPTION OF THE FIRST PREFERRED EMBODIMENT

Figure 1:
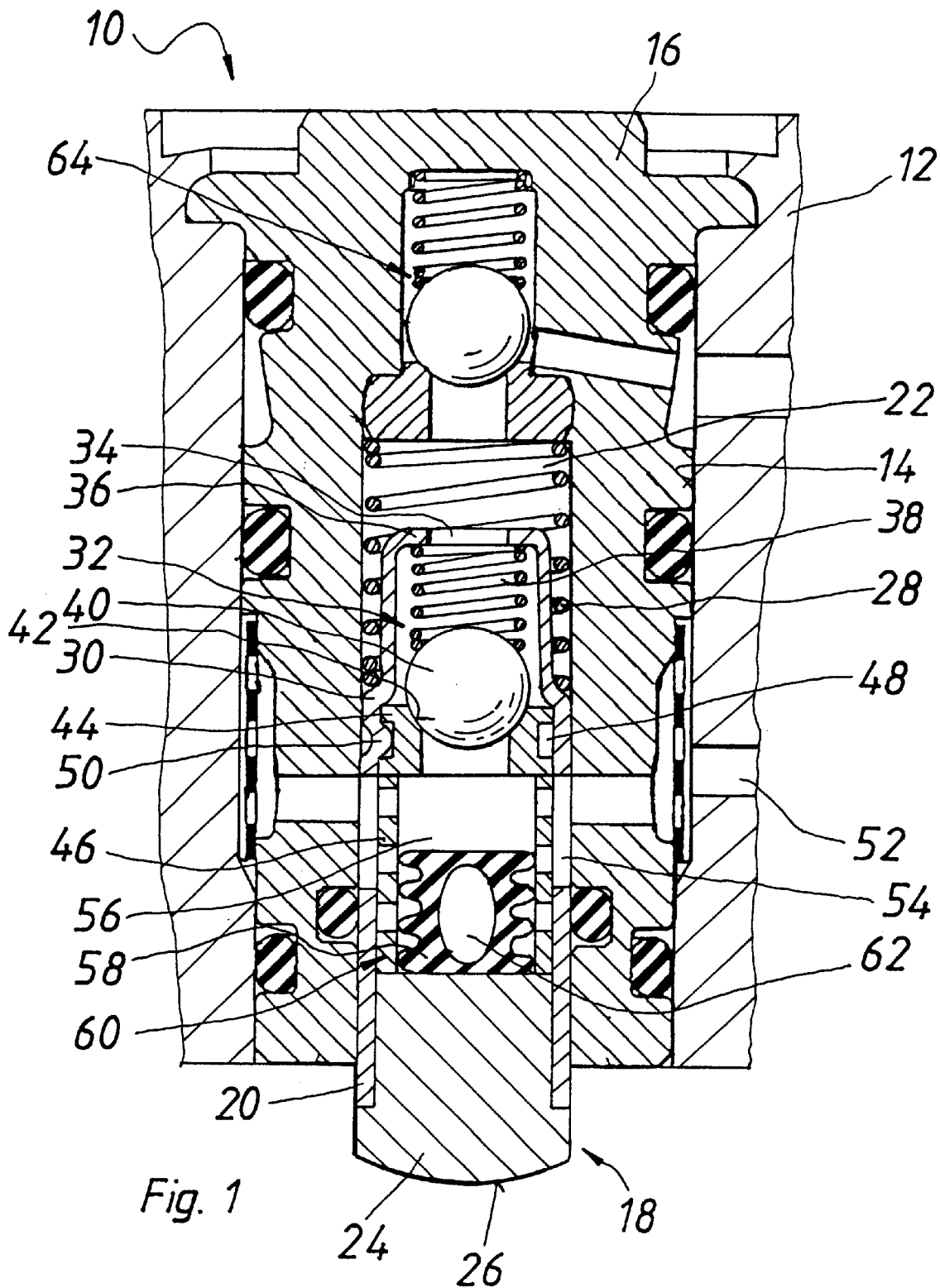

The piston pump of the invention, shown in FIG. 1 and identified overall by reference numeral 10, is intended in particular as a pump in a vehicle brake system and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from braking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The piston pump 10 is accommodated in a hydraulic block 12, of which only a fragment surrounding the piston pump 10 is shown in the drawing. Further hydraulic components, not shown, such as magnet valves of the slip-controlled vehicle brake system are inserted into the hydraulic block 12 and hydraulically connected by the hydraulic block 12 with one another and with the piston pump 10. The hydraulic block 12 forms a pump housing of the piston pump 10 of the invention and will hereinafter be called the pump housing 12.

A cylinder bore 14 is made in the pump housing 12 and a bush 16 made as a turned part is inserted into it.

A piston 18 is axially displaceably received in the bush 16. The piston 18 has a sleeve 20 of metal, which forms a circumferential piston wall. A sealing stopper 24 is press-fitted into an open end of the sleeve 20, remote from a displacement chamber 22 of the piston pump 10, and the stopper is joined to the sleeve 20 for instance by welding. The piston 18 protrudes with its stopper 24 out of the pump housing 12. The stopper 24 has a crowned end face 26, with which it rests on the circumference of an eccentric, not shown, in order to drive the piston 18 into a reciprocating motion. The stopper 24 is hardened, at least in the region of its crowned end face 26. The piston 18 is retained in contact with the eccentric, not shown, by a helical compression spring forming a restoring spring 28, which engages an annular step 30 of the sleeve 20 of the piston 18.

A spring-loaded check valve is integrated as an inlet valve 32 into the piston 18 of the piston pump 10 of the invention: An end of the sleeve 20 toward the displacement chamber 22 is deformed radially inward, leaving a flow opening 34, so as to form an end wall 36 of the piston. On an inner side of this end wall 36 of the piston, a valve closing spring 38 of the inlet valve 32 is supported, embodied as a helical compression spring, which presses the ball 40, acting as the valve closing body, against a conical valve seat 42 of an annular valve seat part 44. This valve seat part 44, inserted into the sleeve 20, is fixed in the axial direction both by the annular step 30 of the sleeve 20 and by a tubular filter screen 46, which is inserted into the sleeve 20 between the valve seat part 44 and the stopper 24.

The axial fixation of the valve seat part 44 in the sleeve 20 can be done, instead of or in addition to the filter screen 46, by adhesive bonding, soldering or welding, for instance, or by form locking or friction locking with the sleeve 20. In the exemplary embodiment shown, an encompassing groove 48 is made in the valve seat part 44, and the sleeve 20 is deformed into the groove by deformation at some points 50 of its circumference.

An inflow to the piston pump 10 of the invention takes place through an inlet bore 52 that discharges radially into the cylinder bore 14. Continuous transverse bores 54 are made in the sleeve 20 of the piston 18 at the level of the inlet bore 52 and are located on a side of the inlet valve 32 remote from the displacement chamber 22. Between the inlet valve 32 and the stopper 24, the piston 18 of the piston pump 10 of the invention has an interior of large volume, because of the thin-walled sleeve 20, and this interior forms a damper chamber 56. This damper chamber experiences a flow through it, upon an intake stroke of the piston pump 10, of brake fluid flowing in through the inlet bore 52 and transverse bore 54 and out through the inlet valve 32; the damper chamber 56 communicates with the brake fluid of the vehicle brake system.

To improve the damping action further, an elastic, cylindrical damper body 58 is inserted into the damper chamber 56. The damper body 58 comprises an elastomer material, such as EPDM (ethylene propylene diene rubber). To improve its damping performance, a circumferential face of the damper body 58 is provided with an undulating profile 60, and the damper body 58 is embodied with a hollow space 62. Because of the thin-walled tube 20, the free space inside the piston 18 is created, which can be used for built-in parts, such as the damper body 58.

As an outlet valve 64, a spring-loaded check valve is inserted into the bush 16 on a side of the displacement chamber 22 opposite the piston 18.

DESCRIPTION OF THE SECOND PREFERRED EMBODIMENT

Figure 2:
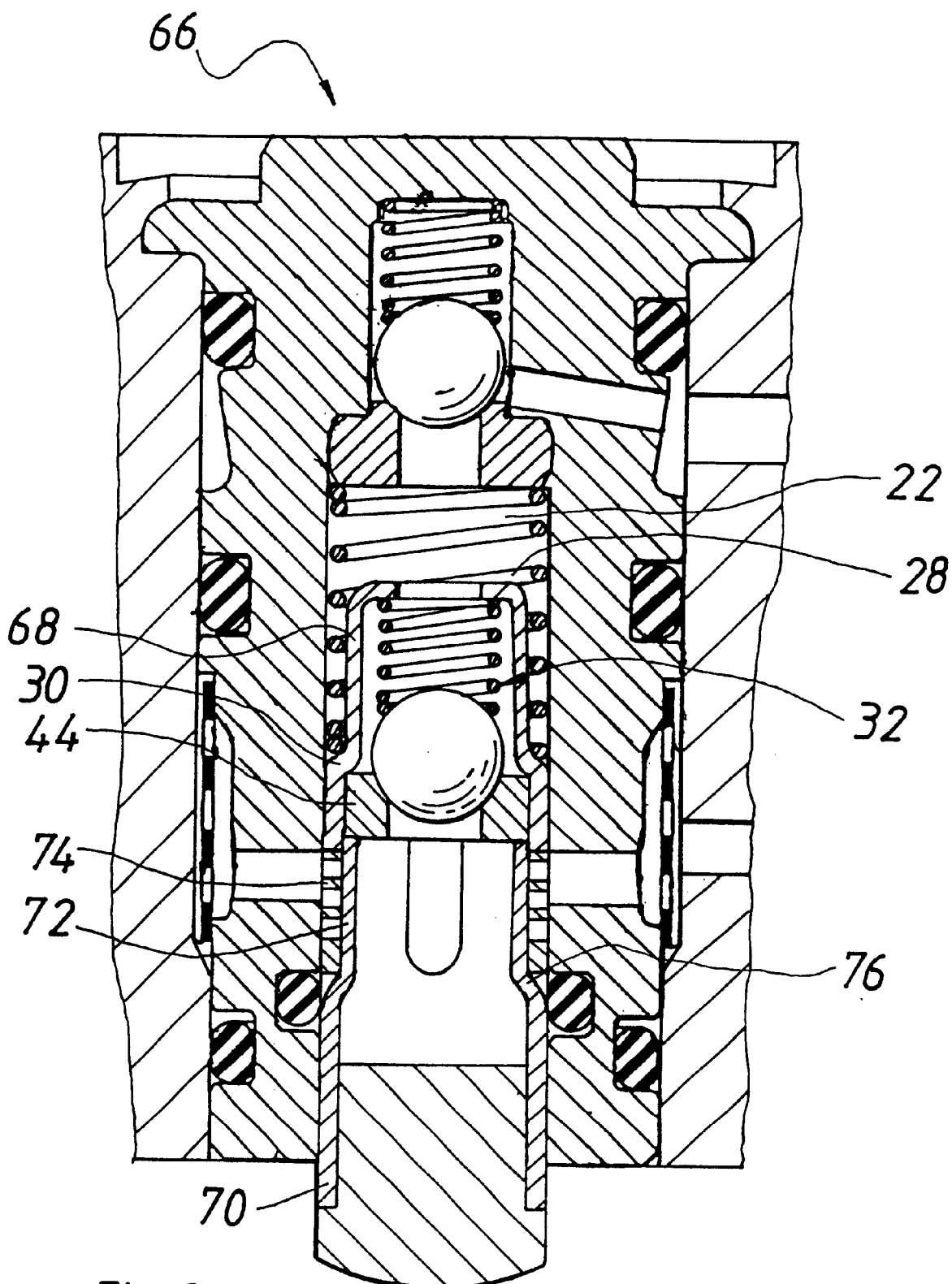

The piston pump 66 of the invention, shown in FIG. 2, has a piston 18 with two sleeves 68, 70, which are joined together in aligned fashion, for instance by welding. The inlet valve 32 is received in a sleeve 68 oriented toward the displacement chamber 22. This sleeve 68 is slipped over the other sleeve 70, which is tapered over somewhat less than half its length by deformation in its diameter by the wall thickness of the sleeve 68, so that both sleeves 68, 70 have the same outside diameter. The valve seat part 44 of the inlet valve 32 is fixed in the axial direction between the annular step 30 of the one sleeve 68, which is engaged by the restoring spring 28, and the end of the other sleeve 70, over which the first sleeve 68 is slipped. A tubular filter screen 74 is thrust on the outside over the narrowed portion 72 of the second sleeve 70 and fixed in the axial direction between the end of the first sleeve 68 and a tapering 78 of the other sleeve 70.

Otherwise, the piston pump 66 shown in FIG. 2 is identical in structure to the piston pump 10 shown in FIG. 1 and functions in the same way. Identical components are identified by the same reference numerals. To avoid repetition reference is made in this regard to the remarks made in conjunction with FIG. 1.

The foregoing relates to preferred exemplary embodiments of the invention, it being understood that other variants and embodiments thereof are possible within the spirit and scope of the invention, the latter being defined by the appended claims.

We claim:

1. A piston pump for a vehicle brake system, comprising a pump housing with a cylinder bore, a piston in said housing that can be driven to reciprocate is axially displaceably received, the piston (18) has at least one sleeve (20; 68, 70) as a deforming part, which forms a circumferential wall of the piston (18), in which a check valve (32) is integrated into the piston (18).

2. The piston pump in accordance with claim 1, in which the sleeve (20; 68, 70) has substantially a constant wall thickness.

3. The piston pump in accordance with claim 1, in which the piston (18) is thin-walled.

4. The piston pump in accordance with claim 1, in which the check valve (32) has a valve seat part (44), which is joined nondisplaceably to the sleeve (20; 68, 70).

5. The piston pump in accordance with claim 1, in which the piston has two sleeves (68, 70), which are joined together in aligned fashion.

6. The piston pump in accordance with claim 1, in which the piston (18) has an interior (56), which communicates with brake fluid to be pumped.

7. The piston pump in accordance with claim 6, in which an elastic damper body (58) is received in the interior (56).

8. The piston pump in accordance with claim 5, in which each of said sleeves have axial portions of equal diameters.

9. A piston pump for a vehicle brake system, comprising a pump housing with a cylinder bore, a piston in said housing that can be driven to reciporate is axially displaceably received, the piston (18) has at least one sleeve (20; 68, 70) as a deforming part, which forms a circumferential wall of the piston (18), in which the piston has two sleeves (68, 70), which are joined together in aligned fashion.

10. The piston pump in accordance with claim 9, in which the piston (18) is thin walled.

11. The piston pump in accordance with claim 9, in which a check valve (32) is integrated into the piston (18), and the check valve (32) has a valve seat part (44), which is joined nondisplaceably to the sleeve (20; 68, 70).

12. The piston pump accordance with claim 9, in which the piston (18) has an interior (56), which communicates with brake fluid to be pumped.

13. The piston pump in accordance with claim 9, in which an elastic damper body (58) is received in the interior (56).

14. The piston pump in accordance with claim 9, in which each of said sleeves have axial portions of equal diameters.

15. A piston pump for a vehicle brake system, comprising a pump housing with a cylinder bore, a piston in said housing that can be driven to reciprocate is axially displaceably received, the piston (18) has at least one sleeve (20; 68, 70) as a deforming part, which forms a circumferential wall of the piston (18), in which sleeve (20; 68, 70) has substantially a constant wall thickness, and on its side which is driven the sleeve (20; 68, 70) is closed by a stopper (24) which is joined firmly to the sleeve (20; 68, 70).

16. The piston pump in accordance with claim 15, in which at least a portion of the stopper (24) extends from the sleeve (20; 68, 70), and which portion includes a crowned surface.

17. The piston pump in accordance with claim 16, in which the crowned surface is hardened.

18. The piston pump in accordance with claim 17, in which the check valve (32) has a valve seat part (44), which is joined nondisplaceably to the sleeve (20; 68, 70).

19. The piston pump in accordance with claim 15, in which the piston (18) has an interior (56), which communicates with brake fluid to be pumped.

20. The piston pump in accordance with claim 15, in which an elastic damper body (58) is received in the interior (56).

* * * * *